May 21, 1946.    H. H. GILBERT    2,400,501
POSITIONING DEVICE
Filed March 22, 1944    2 Sheets-Sheet 1
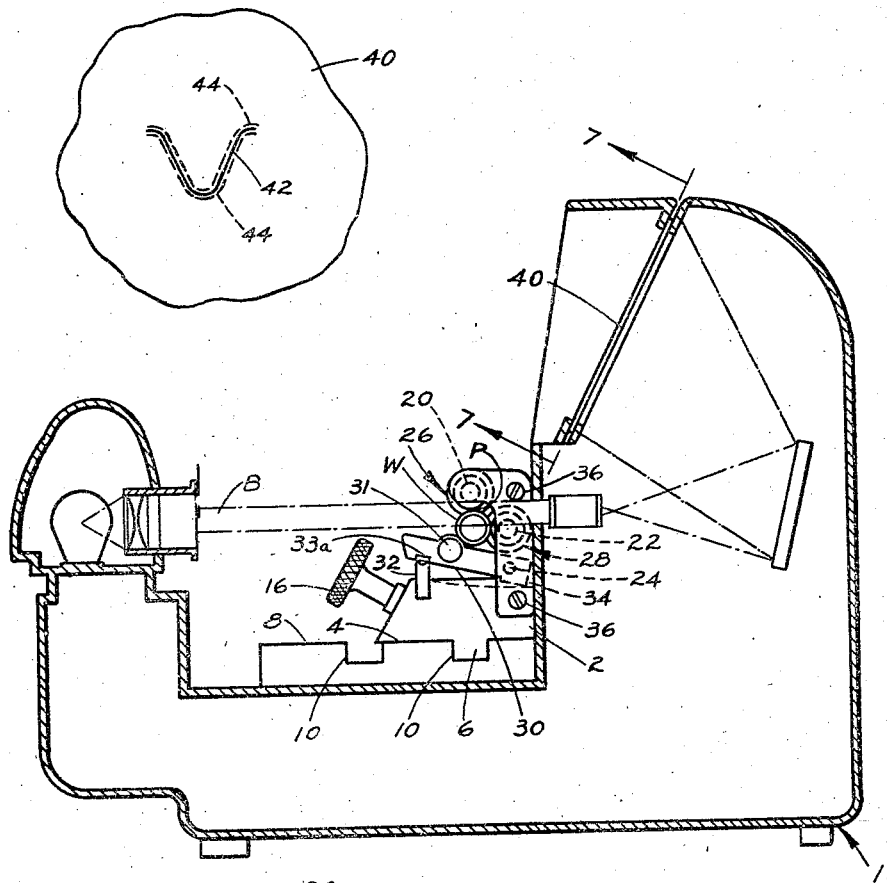
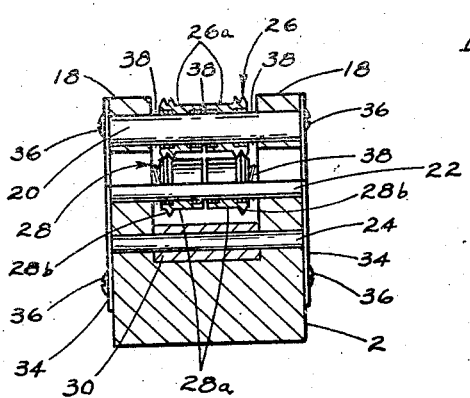
INVENTOR.
HAROLD H. GILBERT
BY
ATTORNEY May 21, 1946.　　　H. H. GILBERT　　　2,400,501
POSITIONING DEVICE
Filed March 22, 1944　　　2 Sheets-Sheet 2

INVENTOR.
HAROLD H. GILBERT
BY
ATTORNEY

Patented May 21, 1946

2,400,501

UNITED STATES PATENT OFFICE 2,400,501

POSITIONING DEVICE

Harold H. Gilbert, Detroit, Mich., assignor to Ex-Cell-O Corporation, Detroit, Mich., a corporation of Michigan Application March 22, 1944, Serial No. 527,627

5 Claims. (Cl. 88—24)

The present invention pertains generally to an improvement in work holding means accessory to an inspection device for quickly and accurately comparing an enlarged image of a portion of a threaded workpiece surface projected on a viewing screen of a conventional projector in comparison facilitating relationship with a pattern inscribed on said screen which may also indicate the tolerances by which the form of the workpiece may acceptably differ from the predetermined pattern.

More specifically my invention pertains to a quick acting device for accurately locating a portion of the threaded surface in a focused position in the path of a light beam transmitted through a conventional optical system of the projection apparatus to determine the correctness of the form of said threads independently of any errors, other than errors of form, which may exist in the thread portion so projected.

In the inspection of precise screw threaded parts such as are required for aeronautical use, there are three thread dimensions which must be held within prescribed tolerances in order that the threaded part may be acceptable. These dimensions are:

The lead or axial advance of one convolution per unit of rotation of the part about the axis of the thread.

The form of the thread, including for certain types of threads, the angle between flanks of the thread convolutions, the radii by which the flanks may be joined to the addendum diameter, the relation of root diameter to pitch diameter and the conformation of the fillets by which the flanks may join the root diameter.

The pitch diameter or diameter on the pitch line.

With previously known thread inspection gages considerable skill and experience is required to avoid mistaking an error in one of these dimensions for an error in another. When precise threads, such as are required for aircraft, must be inspected in quantities, perhaps of several hundreds per operator per hour, by relatively unskilled operators, it is found advantageous to make separate determinations of form, pitch diameter and lead.

It is an object of the present invention to enable an externally threaded diameter of a workpiece to be quickly and accurately located in focused position in the light path of a conventional projection apparatus requiring only to be moved axially to that extent necessary to cause the projection of the form of the thread to be brought into comparison facilitating relation with a predetermined pattern previously marked on the projection screen, irrespective of whether or not there may exist in the said threaded portion an error of pitch diameter or lead.

An additional object of the invention is to enable a threaded diameter to be inserted tangent to two spaced parallel roller type guides and a third movable roller guide having its axis parallel to the two in a three element relationship for holding the threaded piece when the third element is moved into workholding position, said piece when being so held that a line drawn parallel to the axis of the piece through the pitch diameter of successive thread convolutions will, if the convolutions be of correct form, always fall on a fixed imaginary line passing transversely through the focused light ray of the optical system of the projection apparatus regardless of any errors which may exist in the pitch diameter or lead of the said threaded diameter.

A further object of my invention is to enable a threaded piece, when so held in projecting position, to be moved axially with convenience and precision by a mere rotation of the workpiece to cause any thread convolution to travel through the axial distance which may be necessary to bring it into form comparing relation with the predetermined thread pattern on the viewing screen.

A still further object of the invention is to form one or both of the two axially spaced roller guides with thread convolution holding means at two spaced points axially of the roller which holding means are movable relative to their respective roller axis and to each other and to form at least one of the three work holding rollers as an axially immovable cylinder to permit rotation of the workpiece to bring a desired convolution intermediate the held convolutions within the light beam of the projection apparatus in comparison facilitating relation with the said pattern.

In the drawings:

Fig. 1 shows one embodiment of my positioning device, with a workpiece positioned therein, in operative association with a projection device fragmentarily and schematically shown.

Fig. 5 is a sectional view on lines 5—5 of Fig. 2.

Fig. 7 is a fragmentary view of the projection apparatus showing a portion of the projection screen as seen along lines 7—7 of Fig. 1.

Figure 3:
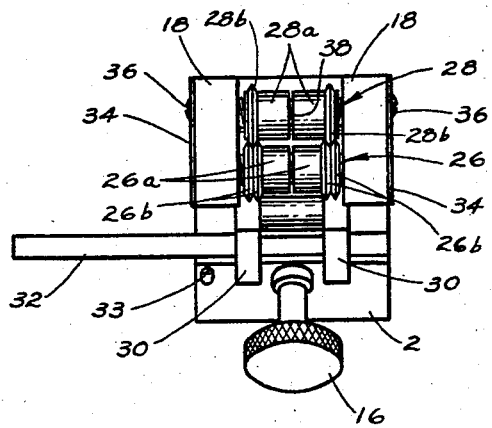
Fig. 3 is a plan view looking on the device of Fig. 2.
Figure 6:
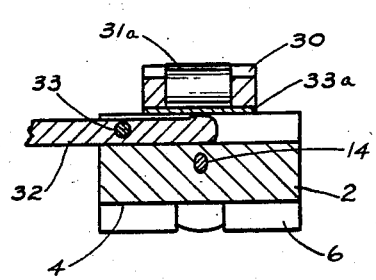
Fig. 6 is a sectional view on lines 6—6 of Fig. 2.
Figure 2:
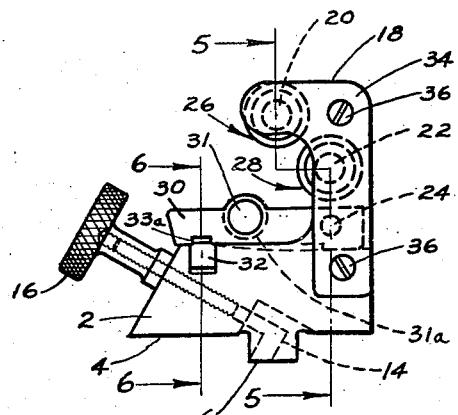
Fig. 2 shows an end view looking on the device as shown in Fig. 1 but somewhat enlarged in scale with holding means released and workpiece removed.

Referring more particularly to the drawings, the embodiment of my invention herein illustrated includes a frame 2 having a bottom planar sliding surface 4 with depending longitudinal rib 6 for slidingly engaging respectively a planar fixture mounting top surface 8 and one of the coacting slots 10 of the projector 12 to which the frame 2 may be held in fixed position by the conventional hook bolt 14 and knurled locking nut 16.

Two upstanding rear bracket portions 18 of frame 2 are pierced by longitudinal shafts 20, 22, 24 each parallel to longitudinal elements of the rib 6 and supporting respectively roller assemblies 26, 28 and the pivoted leaf 30. The leaf 30 is oscillable about its axis upon depression of lever 32 which acts about its pivotal axis 33 to apply pressure on leaf portion 33a to raise the forward portion of leaf 30 about its axis 24 whereby to raise the plain cylindrical roller 31a having an axial shaft 31 which is mounted therein in parallel relation with axes 20, 22, 24 into work holding relation in which a workpiece W may be held between roller assemblies 26, 28 and cylindrical roller 31 as best seen in Fig. 1. The shafts 20, 22, 24 are held against longitudinal movement in brackets 18 by end plates 34 fastened thereto by suitable screws 36.

The roller assemblies 26, 28 comprise respectively like but oppositely mounted portions 26a, 28a each of which is movable relatively to its mounting shaft and to its like opposed portion with the opposed portions being resiliently held in approximately their work holding position by compression springs 38 oppositely acting on each of the portions 26a and 28a.

In the present instance each of the portions 26a is formed with two spaced peripheral convolutions 26b each adapted to engage outwardly facing flanks respectively of two spaced convolutions of the workpiece W and each of the portions 28a is formed with one convolution 28b adapted to engage inwardly facing flanks of two spaced pairs of convolutions of the workpiece W. The resilient mounting of the portions 26a, 28a allows them to move longitudinally on their respective shafts by deflection of springs 38 so that pitch circles of the workpiece (if the form thereof is substantially correct) and pitch circles of the convolutions of the roller assemblies will become tangent irrespective of the lead of the thread on the workpiece.

Figure 4:
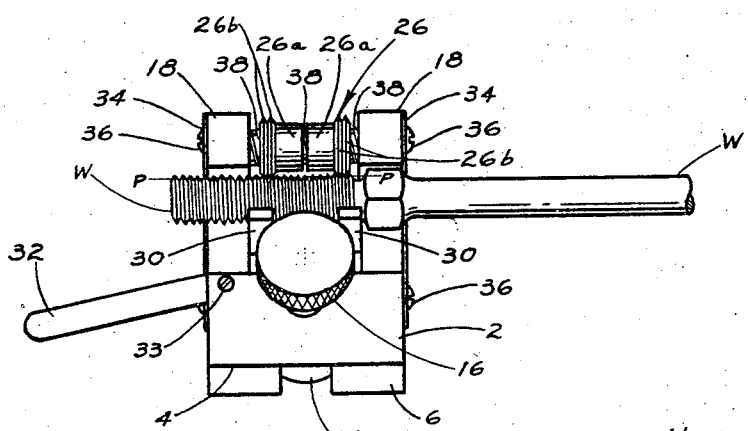
Fig. 4 is a front elevational view on the device of Fig. 2 with workpiece in position.

Reference to Fig. 4 shows that a line P—P drawn through the points of tangency P (Fig. 1) of the pitch circles of the rollers of assemblies 26 and the pitch circles of the workpiece W occupies a fixed position in space irrespective of the diameter of the workpiece and the last said line passes transversely through the light beam B of the projection apparatus. The said light beam, by means of a conventional optical system as diagrammatically shown in Fig. 1 may be focused on said line so that an image of the thread form of the workpiece may be projected on the translucent screen 40 of the projection apparatus substantially as the full line 42 of Fig. 7 in form comparison facilitating relationship with the dotted pattern lines 44 inscribed on said screen which define the limits or tolerances within which the projected image must be found if the form of the thread is acceptable.

After the work W has been inserted by the operator in approximate position and depression of the lever 32 has raised the leaf 30 and the cylindrical roller 31 into work holding position, the cylindrical surface of the roller will contact the addendum or outside diameter of a number of thread convolutions on the workpiece thus holding the pitch line P—P (see Fig. 4) of the workpiece in the elevated position required to facilitate inspection, however, it may well be that the workpiece may require movement longitudinally of its axis to bring the projection of a given thread convolution into comparison facilitating relation with the pattern lines 44.

The desired axial movement may readily be given to the work by rotating it about its axis. If the thread convolutions contacting the roller 31 do not slip axially of the roller, the springs 38 will suffer deflection while the work W moves axially of its length. If the springs 38 resist deflection, the thread convolutions of the work W must slip axially of the roller 31. In either event the work W may, by rotation, be moved axially of its length to bring the given thread convolution into comparison facilitating relation with the pattern lines 44.

I have, therefore, shown and described one preferred embodiment of my work positioning device by which a threaded workpiece may be positioned while the form of given thread convolutions on a workpiece is projected in form comparison relation with a master pattern irrespective of errors in pitch diameter or lead which may exist in the threaded portion of said workpiece.

It will be seen that my invention is susceptible to many modifications and alternative constructions without departure from the spirit thereof. I, therefore, intend not to limit its scope except as may be defined in the appended claims.

I claim as my invention:

1. A device for holding a pitch line of a threaded diameter on a workpiece in a predetermined position irrespective of possible errors in pitch or pitch diameter thereof including in combination, a base, one fixed and at least two additional parallel shafts mounted in transversely spaced relation in said base at least one of said additional shafts being movable transversely toward and from said fixed shaft, the axis of the said fixed shaft being on extended lines passing transversely through the said pitch line of the held workpiece and the center of the threaded diameter thereof, roller means rotatable and slidable on the last said shaft including two spaced rollers axially movable with respect to each other, spring means normally locating said rollers individually in predetermined yieldable axial position, each of said rollers having formed on the periphery thereof an encircling convolution which in a portion thereof including its pitch circle is substantially complementary to the thread convolutions on the workpiece, said convolutions on the respective rollers being adapted to engage inwardly facing flanks of adjacent convolutions of the threaded workpiece at spaced points along its length, one of said additional shafts having a plain cylindrical roller thereon, rollers rotatable and slidable on the remaining one of said shafts, spring means normally locating said last mentioned rollers individually in predetermined yieldable axially spaced relation, and means on said base to move said shafts relatively to each other from a non-holding to a work-holding position wherein the pitch line of a correctly formed convolution on a workpiece is held in a position which coincides with a line drawn through the respective points of tangency of the pitch circles of the said roller convolutions and the pitch circles of the workpiece contacted thereby.

2. A device for holding a pitch line of a threaded diameter on a workpiece in a predetermined position irrespective of possible errors in pitch or pitch diameter thereof including, in combination, a base, one fixed and at least two additional parallel shafts mounted in transversely spaced relation in said base, at least one of said additional shafts being movable transversely toward and from said fixed shaft, the axis of the said fixed shaft being on extended lines passing transversely through the said pitch line of the held workpiece and the center of the threaded diameter thereof, roller means on the last said shaft including two spaced rollers axially movable with respect to each other, spring means normally locating said individual rollers yieldably in predetermined axial position, each of said rollers having formed on the periphery thereof two encircling convolutions which in a portion thereof including their pitch circles are substantially complementary to the thread convolutions on the respective workpiece, said convolutions on the respective rollers being adapted to engage outwardly facing flanks of single convolutions of the threaded workpiece at spaced points along its length, rollers on the two remaining said shafts and means on said base to move said shafts relatively to each other from a non-holding to a work-holding position wherein the pitch line of correctly formed convolutions on a workpiece are held in a line which coincides with a line drawn through the respective points of tangency of the pitch circles of the said roller convolutions and the pitch circles of the workpiece contacted thereby.

3. A three element chucking device for holding a pitch line of a threaded diameter on a workpiece in a predetermined position irrespective of possible errors in pitch or pitch diameter thereof including, in combination, a base, two fixed shafts having parallel axes and supported in said base, one of said shafts being on extended lines passing transversely through the said pitch line of the held workpiece and the center of the threaded diameter thereof, roller means on the last said shaft including two spaced rollers axially movable with respect to each other, each of said rollers having formed on the periphery thereof two encircling convolutions which in a portion thereof including their pitch circles are substantially complementary to the thread convolutions on the workpiece, said convolutions on the respective rollers being adapted to engage outwardly facing flanks of single convolutions of the threaded workpiece at spaced points along its length, the other fixed shaft having thereon roller means including two rollers axially movable relative to each other, each of said rollers being formed on the periphery thereof with an encircling convolution which in a portion thereof including its pitch circle is substantially complementary to the thread convolutions on the workpiece, said convolutions on said last mentioned rollers being adapted to engage respectively inwardly facing flanks of two thread convolutions on the workpiece at spaced points along its length, a leaf member pivotally mounted in said body, a shaft mounted in said leaf and movable with pivotal movement thereof in parallel but altered spaced relation to the said two first named shafts, a plain cylindrical roller on said movable shaft for engaging the outside diameter of the workpiece, said movable shaft being positionable in respect to said fixed shafts for exerting through said rollers a three element work holding contact on the workpiece and into a non-holding position to release the same, and manually actuated lever means for pivotally moving the leaf.

4. A three element chucking device for holding a pitch line of a threaded diameter on a workpiece in a predetermined position irrespective of possible errors in pitch or pitch diameter thereof including, in combination, a base, two fixed shafts having parallel axes provided in said base, one of said shafts being on extended lines passing transversely through the said pitch line of the held workpiece and the center of the threaded diameter thereof, roller means on the last said shaft including two spaced rollers axially movable with respect to each other, each of said rollers having formed on the periphery thereof two encircling convolutions which in a portion thereof including their pitch circles are substantially complementary to the thread convolutions on the workpiece, said convolutions on the respective rollers being adapted to engage outwardly facing flanks of single convolutions of the threaded workpiece at spaced points along its length, the other fixed shaft having thereon roller means including two rollers axially movable relative to each other, each of said last mentioned rollers being formed on the periphery thereof with an encircling convolution which in a portion thereof including its pitch circle is substantially complementary to the thread convolutions on the workpiece, said last mentioned convolutions being adapted to engage respectively inwardly facing flanks of two thread convolutions on the workpiece at spaced points along its length, a leaf member pivotally mounted in said body, a shaft mounted in said leaf member and movable with pivotal movement thereof in parallel but altered spaced relation to the said two first named shafts, a plain cylindrical roller on said movable shaft for engaging the outside diameter of the workpiece, said movable shaft being positionable in respect to said fixed shafts for exerting through said rollers a three element work holding contact on the workpiece and into a non-holding position to release the same, manually actuated lever means for pivotally moving said leaf member, resilient means for holding the rollers of said first roller means in their approximate operating position while said movable shaft is in a non-holding position, and resilient means for holding the rollers of said second roller means in their approximate operating position while said movable shaft is in a non-holding position.

5. In apparatus for inspecting the form of convolutions on the diameter of a screw threaded workpiece including, in combination, an optical projector having a light source, an optical system, a viewing screen, said light source being adapted to emit a light beam for projecting the image of a thread convolution on the viewing screen, a device for holding a pitch line of the threaded diameter in predetermined position in the light beam irrespective of possible errors in pitch or pitch diameter thereof including, a base, two fixed shafts having parallel axes provided in said base, one of said shafts being on extended lines passing transversely through the said pitch line of the held workpiece and the center of the threaded diameter thereof, roller means on the last said shaft including two spaced rollers axially movable with respect to each other, each of said rollers having formed on the periphery thereof two encircling convolutions which in a portion thereof including their pitch circles are substantially complementary to the thread convolutions on the workpiece, said convolutions on the respective rollers being adapted to engage outwardly facing flanks of single convolutions of the threaded workpiece at spaced points along its length, the other fixed shaft having thereon roller means including two rollers axially movable relative to each other, each of said rollers being formed on the periphery thereof with an encircling convolution which in a portion thereof including its pitch circle is substantially complementary to the thread convolutions on the workpiece, said last mentioned convolutions being adapted to engage respectively inwardly facing flanks of two thread convolutions on the workpiece at spaced points along its length, a leaf member pivotally mounted in said body, a shaft mounted in said leaf member and movable with pivotal movement thereof in parallel but altered spaced relation to the said two first named shafts, a plain cylindrical roller on said movable shaft for engaging the outside diameter of the workpiece, said movable shaft being positionable in respect to said fixed shafts for exerting through said rollers a three element work holding contact on the workpiece and into a non-holding position to release the same, and manually actuated lever means for pivotally moving the leaf member.

HAROLD H. GILBERT.